United States Patent [19]

Tsunoda

[11] 4,359,713

[45] Nov. 16, 1982

[54] VOICE WARNING SYSTEM WITH AUTOMATIC VOLUME ADJUSTMENT FOR AN AUTOMOTIVE VEHICLE

[75] Inventor: Masakazu Tsunoda, Fujisawa, Japan

[73] Assignee: Nissan Motor Company, Limited, Kanagawa, Japan

[21] Appl. No.: 182,237

[22] Filed: Aug. 28, 1980

[30] Foreign Application Priority Data

Aug. 31, 1979 [JP] Japan ................................ 54-110250
Aug. 31, 1979 [JP] Japan ........................... 54-119114[U]

[51] Int. Cl.[3] .......................... G08B 21/00; B60Q 5/00

[52] U.S. Cl. ................................ 340/52 F; 179/1 SM; 340/521; 340/692

[58] Field of Search ...................... 340/692, 52 F, 521; 179/1 SM; 364/425, 424

[56] References Cited

U.S. PATENT DOCUMENTS 3,808,591 4/1974 Panicello et al. .
3,859,629 1/1975 Komiyama et al. ................ 340/692
3,870,818 11/1975 Barton et al. .
4,015,237 3/1977 Takatani et al. .................. 340/52 F
4,072,850 2/1978 McGlynn .......................... 340/52 F
4,074,244 2/1978 Balderson .
4,135,143 1/1979 Argentieri et al. ................. 340/692

OTHER PUBLICATIONS

Bodley, Nicholos, "Here's a Breakthrough—A Low Cost Speech Synthesizer on a Chip", Electronic Design 7/19/78.

*Primary Examiner*—Glen R. Swann, III
*Attorney, Agent, or Firm*—Lowe, King, Price & Becker

[57] ABSTRACT

A voice warning system for an automotive vehicle automatically adjusts voice volume in accordance with the urgency or importance of a vocal warning concerning engine operating conditions, and with car radio volume as selected by the vehicle user. A plurality of sensors output signals in response to abnormal engine or vehicle conditions. A volume memory recognizes and stores the current volume setting of the car radio. A voice volume selector produces a voice volume signal according to the volume memory value, and according to which sensor signal is received. An electronic volume controller responds to the voice volume signal to set the volume of a voice warning signal selected by a voice output selector in response to the received sensor signal.

8 Claims, 7 Drawing Figures

VOICE WARNING SYSTEM WITH AUTOMATIC VOLUME ADJUSTMENT FOR AN AUTOMOTIVE VEHICLE

BACKGROUND OF THE INVENTION

1. Field of the Invention

The present invention relates generally to a voice warning system for an automotive vehicle, and more particularly to a voice volume controller provided for the voice warning system whereby the voice volume is automatically changed according to the degree of urgency of warning information on various vehicle operating conditions. In this case, the driver is informed of various operating conditions, in voice form, according to the car-radio sound volume as adjusted by driver preference in addition to the degree of urgency.

2. Description of the Prior Art

Heretofore, as means for informing the driver of various vehicle operating conditions, there have been used various meters with pointers and various warning indication lamps. In addition, recently, there have appeared vehicles in which a computer is mounted so as to display digitally various vehicle operating conditions whenever the driver depresses pushbuttons to obtain the vehicle conditions. That is to say, in these devices, the driver is informed of the vehicle conditions through the sense of sight. On the other hand, as devices by which the driver is informed through the sense of hearing, there have been used various devices which produce a simple warning sound such as buzzer or chime.

Although these conventional warning devices which depend upon the sense of sight have the advantage that a number of vehicle conditions can be displayed at the same time, it is comparatively difficult to attract the driver's attention and to give the driver complicated information. Also, in the case of the conventional devices which depend upon the sense of hearing, it is difficult to inform the driver of different items of information, even if the device can attract the driver's attention.

Therefore, recently, various voice warning systems have come to be used for vehicles by which the driver can hear various vehicle operating conditions such as the distance traveled detected by a trip meter, the amount of fuel consumed and so on, in voice form.

When such a device as described above is used for an automotive vehicle, it is possible to attract the driver's attention well and also to inform the driver of relatively complicated vehicle operating conditions without any difficulties. In this case, however, since there are various kinds of information, for example, information being required frequently or occasionally, information being important or less important, or information being urgent or less urgent, if the information is always indicated to the driver at a constant sound level, there has arisen a problem that the driver feels noisy when the sound level is too high and fails to hear when too low.

Therefore, there is a need for a voice warning system for an automotive vehicle by which the driver can always hear the warning voice at an appropriate sound level according to the kind of warning information.

BRIEF SUMMARY OF THE INVENTION

With these problems in mind, therefore, it is the primary object of the present invention to provide a voice warning system for an automotive vehicle by which the voice volume of warning information is automatically changed to an appropriate level according to the kind of the information.

To achieve the above-mentioned object, the voice warning system of the present invention comprises a voice volume selector for automatically controlling the voice output level according to the kinds of information, in addition to a voice warning system for an automotive vehicle. By using the system thus improved, the driver can hear important or urgent information at a relatively higher sound level, and other information at a lower level, as compared with a level adjusted by driver preference.

BRIEF DESCRIPTION OF THE DRAWINGS

The features and advantage of the voice warning system of the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figures 1, 1A:
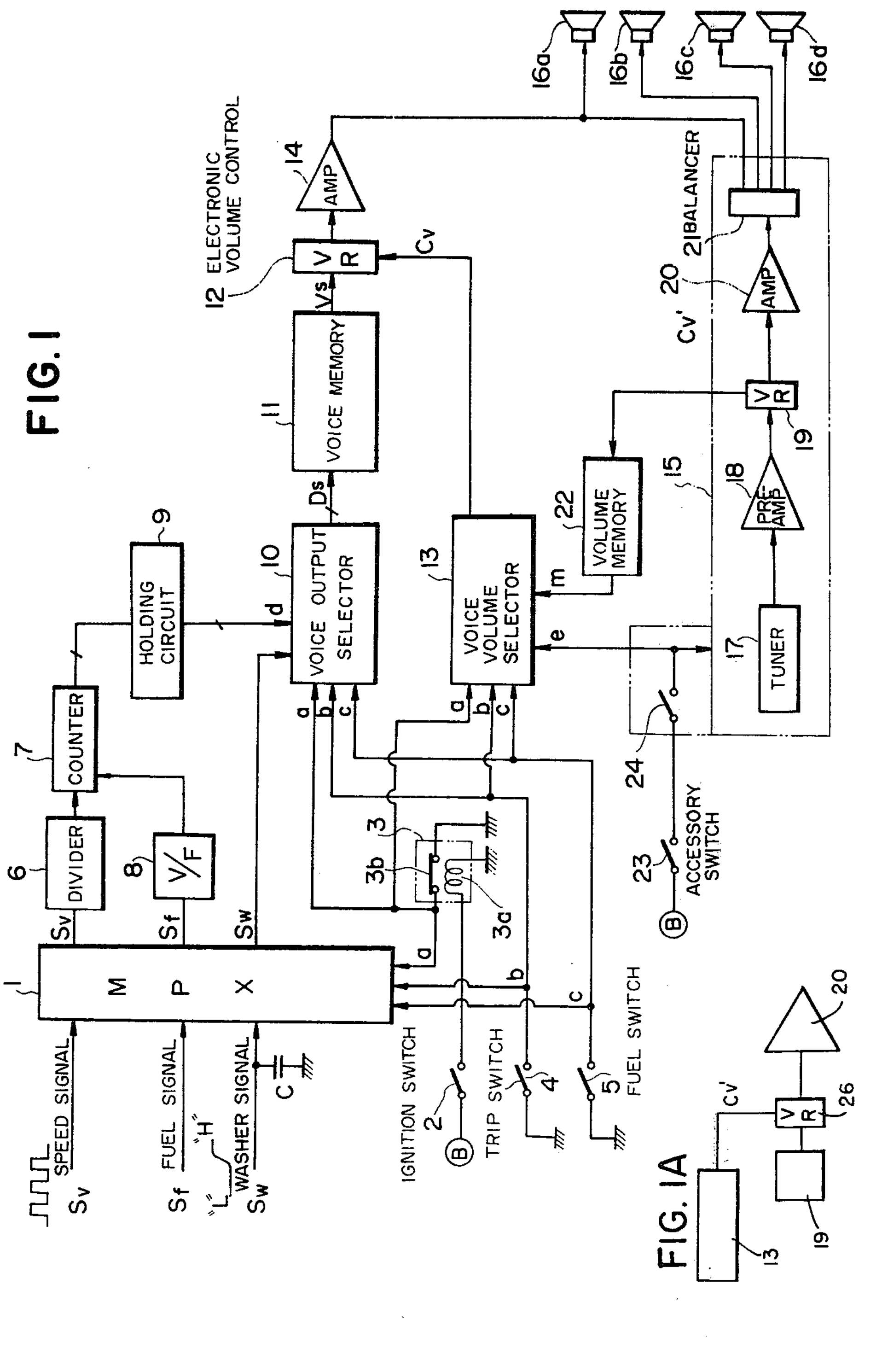
FIG. 1 is a schematic block diagram of a first embodiment of the present invention.
FIG. 1A is a schematic block diagram of a modification of the embodiment of FIG. 1, in which an electrically variable resistor 26 is additionally provided.

Reference is now made to the figures, and more specifically to FIG. 1, wherein a first preferred embodiment of the present invention is illustrated.

In FIG. 1, the numeral 1 denotes a multiplexer to which are inputted various signals for indicating vehicle operating conditions such as a vehicle speed pulse signal $S_v$ from a speed sensor, a fuel voltage signal $S_f$ from a fuel sensor indicating the amount of remaining fuel, and a washer liquid L/H level voltage signal $S_w$ from a washer liquid sensor where the detected voltage level is changed from "H" to "L" when the level of the washer liquid decreases below a predetermined level. One of these signals $S_v$, $S_f$, and $S_w$ is selectively output to the next stage when any of the points, a, b, and c connected to the control terminals of the multiplexer 1 is turned to a ground level by actuating any of the switches 2, 4, and 5.

In more detail, the numeral 2 denotes an ignition switch to output the washer liquid signal $S_w$ from the multiplexer 1 in such a way that when the switch 2 is turned on, a current flows from a bettery B to a coil 3*a* of a relay 3 to open a normally-closed contact 3*b* and when turned off, the current is cut off to close the contact 3*b*, namely, to ground the point a. Further, in this case, the washer liquid signal is held for a while by a condenser c after the ignition switch 2 has been turned off.

The switch 4 is a trip switch to output the speed signal $S_v$ from the multiplexer 1 by connecting point b to the ground level when turned on. And, also, the switch 5 is a fuel switch to output the fuel signal $S_f$ from the multiplexer 1 by connecting point c to the ground level when turned on.

When output from the multiplexer 1, the vehicle speed signal $S_v$ is divided by a divider 6, counted by a counter 7, and stored as information indicative of distance traveled in a holding circuit 9 every time the number counted by the counter 7 reaches a predetermined value (for example, corresponding to traveling a distance of 5 km).

When output from the multiplexer 1, the fuel signal $S_f$ is converted into a pulse signal of a frequency corresponding to the signal voltage by a V-F converter 8, counted for a given period by the counter 7, and held in the holding circuit 9 as information indicating the amount of remaining fuel.

On the other hand, the washer signal $S_w$ is directly output to the next stage.

The numeral 10 denotes a voice output selector, which inputs a signal d held in the holding circuit 9 or the washer signal $S_w$ (L/H level signal) as the data signal when any of ignition switch 2, trip switch 4, and fuel switch 5 is turned on to ground one of the points a, b, and c. Voice output selector 10 next selects the voice outputs, for example, such as "Replenish washer liquid", or "Fuel tank is now half full", which are previously stored in a voice memory 11, in accordance with the signal d or $S_w$, and finally outputs a voice output designation signal $D_s$ in the form of a binary digit code, to select one of the voice outputs in a voice memory 11.

The voice selector 10 can be formed by using a wired logic system, but may also be implemented by means of a program for a microcomputer, as will be explained in the second embodiment.

In the voice memory 11, necessary warnings are stored in units of sentences, phrases, words, or phonemes. The warnings are output as a series of voice signals $V_s$ after selection in accordance with the voice output designation signal $D_s$, output from the voice output selector 10.

In the voice memory 11, in the case where the number of different items of information to be noticed is small, it is possible to record the necessary voice information on different tracks of an endless tape, select the track on which the required information is recorded in accordance with the voice output designation signal $D_s$, and reproduce the warning through a speaker.

However, in the case where the number of different items of information is large or the information varies, a magnetic recording device as explained above may become excessively bulky, the access time also becoming long, and it may be difficult to change the information freely. Therefore, in this case, it is very convenient to use a synthesizer using a linear prediction coding system which has recently put on the market by the Texas Instruments Incorporated in the USA, as explained in the second embodiment.

The numeral 12 denotes an electronic volume controller of voltage control type including transistors and FETs, whereby the level of the voice signal $V_s$ outputted from the voice memory 11 is controlled according to a voice control signal $C_v$ (explained later) from the voice volume selector 13. The numeral 14 denotes an audio amplifier, and the voice amplified by the audio amplifier 14 is reproduced through one of a plurality of loudspeakers 16*a* to 16*d* provided for other audio equipment such as a car radio 15.

As is well known, a conventional car radio 15 comprises a tuner 17, a preamplifier 18, a volume control 19 (variable resistor), an amplifier 20, and a balancer 21 to balance the respective sound volume of the speakers 16*a*–16*d* (unnecessary when only one speaker is used).

The numeral 22 denotes a volume memory for storing a sound volume value as set by the volume control 19 in the car radio 15. When a usual rotary type or linear motion type variable resistor is used for the control 19, a variable resistor of the same type can be used by connection thereto. On the other hand, when an electronic volume control is used (controllable from the outside), the volume memory 22 must store the control voltage signal electrically even when the power supply of the car radio 15 is turned off at the time when this stored sound volume signal m is output to the voice volume selector 13. In this case, it is also possible to use a volume control 19 (variable resistor) provided for the car radio 15 as the volume memory 22 for directly reading out the sound volume value as set in the car radio 15.

The numeral 23 denotes an accessory switch which is assembled together with an ignition switch 2 and is turned on at the first click position of the key. The numeral 24 denotes a power switch of the car radio 15. Only when both the switches 23 and 24 are turned on, the car radio operates and the sound is output from the speakers 16*a* to 16*d* at a sound level as set by the driver using the volume control 19. When the two switches 23 and 24 are both on, a supply voltage signal e for the car radio is sent to the voice volume selector 13, so that the selector 13 detects that the car radio is operating.

The voice volume selector 13 can determine the volume of voice information according to the kinds of information to be noticed, whether or not the car radio is operating, and the car-radio sound volume as adjusted by driver preference. That is to say, the kinds of information are discriminated depending upon which signals a, b, and c are grounded; the operation or inoperation of the car radio is discriminated depending upon the presence or absence of the voltage signal e; the car-radio sound volume is detected depending upon the level of the voice volume signal m stored in the volume memory 22. After discrimination or detection, the voice volume selector 13 outputs a voice volume control signal $C_v$ to the electronic volume controller 12 so as to output the voice at an appropriate sound level according to the respective situation.

Figure 2:
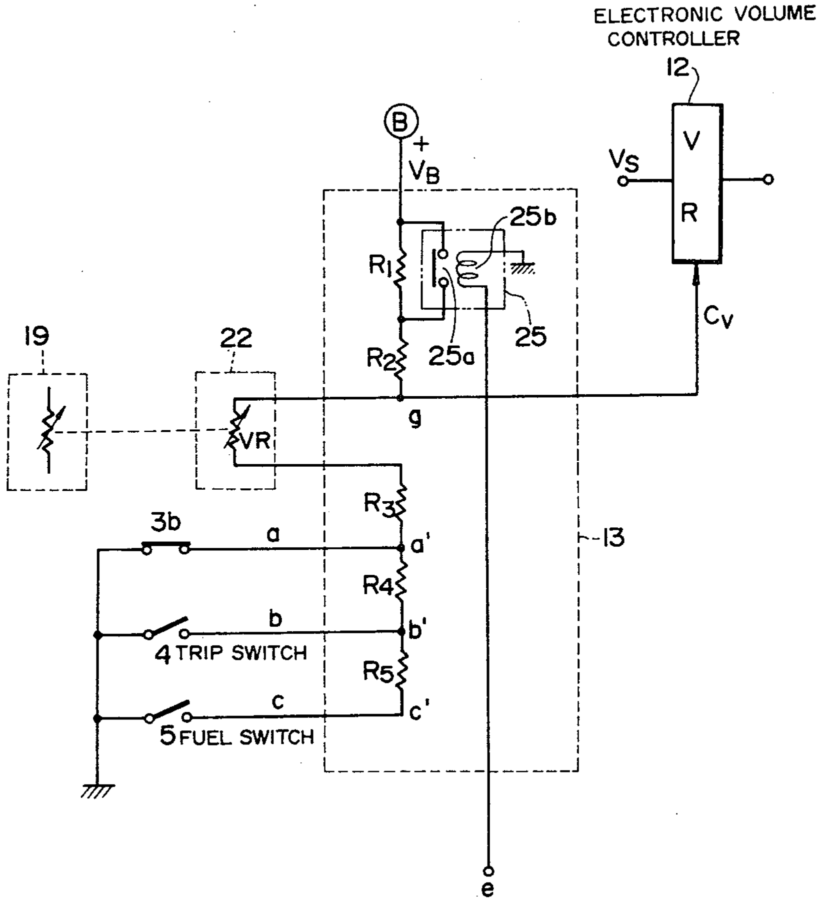
FIG. 2 is an example wiring diagram of a voice volume selector used with the present invention.

FIG. 2 shows an example circuit diagram of the voice volume selector of a potential divider type.

In this diagram, resistors from $R_1$ to $R_5$ are connected in series between the anode of a battery B and the ground, with a variable resistor (VR) 22 disposed between $R_2$ and $R_3$. In this case, the shaft of the variable resistor 22 is mechanically linked together with that of the other variable resistor 19 with which the radio sound is adjusted. In addition, in order to ground the points a', b', and c', a relay contact 3*b*, a trip switch 4, and a fuel switch 5 are connected thereto. Two normally-open relay contacts 25*a* of a relay 25 are connected in parallel with the resistor $R_1$ so as to short the resistor $R_1$ only when the voltage signal e (outputted when the car radio is turned on) is applied to the relay coil 25*b* to make the sound louder.

A voice volume control signal $C_v$ is outputted from point g to the electronic volume controller 12, as a voltage that a battery voltage $V_B$ is divided by a ratio of $(R_1+R_2)$ and $(R_1+R_2+VR+R_3+R_4+R_5)$. Therefore, if the resistance of the variable resistor 22 is fixed and the relay 25 is open, the point a' is grounded only when the relay contact **3*b* is on (when the ignition switch 2 is off, in FIG. 1), and thus the voltage level of the voice volume control signal $C_v$ at point g becomes the lowest. When the relay contact 3*b* is off and the trip switch 4 is on, since the point b' is grounded, the voltage level of $C_v$ becomes medium; when the fuel switch 5** is on, since the point c' is grounded, the voltage level of $C_v$ becomes the highest.

Accordingly, if a voltage control type electronic variable resistor using transistors and FETs is used for the electronic volume controller, and if the relation between the voice volume control signal $C_v$ and the volume control resistance is so designed that the higher the voltage of $C_v$, the less the resistance (the less the attennuation of the voice signal $V_s$, that is, the louder the output voice), or vice versa, it is possible to control the voice volume to a certain quiet level in the case of washer liquid information, to a medium level in the case of trip meter information, and to a certain louder level in the case of fuel information.

In this case, the guideline of voice volume can be determined as follows:

In the case of washer liquid information, since the voice is output when the ignition switch is turned off to stop the engine, sound noise is little and the driver can hear the quiet voice; in the case of trip information, since the voice is output when the car is traveling, noise is a somewhat higher and a certain increasing voice volume may be necessary; in the case of fuel information, since the warning voice is output only when the amount of remaining fuel is below a predetermined level, the information is important or urgent, and a certain louder voice volume may be required as compared with other information.

Next, when the car radio 15 of FIG. 1 is operating, since the voltage signal e activates the relay 25 to short the resistor $R_1$, in this case, the voltage at point g becomes higher and thus the voice volume becomes higher for every information source as compared with the case where the car radio is not operating, with the result that the driver can hear the warning information clearly even while the radio sound is being outputted.

In addition, since the variable resistor 22 changes according to changes in the variable resistor 19 in the car radio 15, the louder the radio sound, the larger the resistance of the VR 19, or vice versa. Accordingly, the louder the radio sound, the higher the voltage at point g, that is, the louder the warning voice.

Further, in the embodiment of FIG. 1, it is possible to provide another electronic variable resistor 26 between the variable resistor 19 and the amplifier 20 as shown in FIG. 1A, in order to reduce the sound level of the car radio 15 by applying a second sound volume control signal $C_v'$ from the voice volume selector 13 to the variable resistor 26 only when the voice volume selector 13 is outputting a voice volume control signal $C_v$ to the electronic volume controller 12.

Further, the electronic volume control 12 can be provided within the amplifier 14, or the amplifier itself 14 can be designed as a voltage control type variable gain amplifier.

Figure 3:
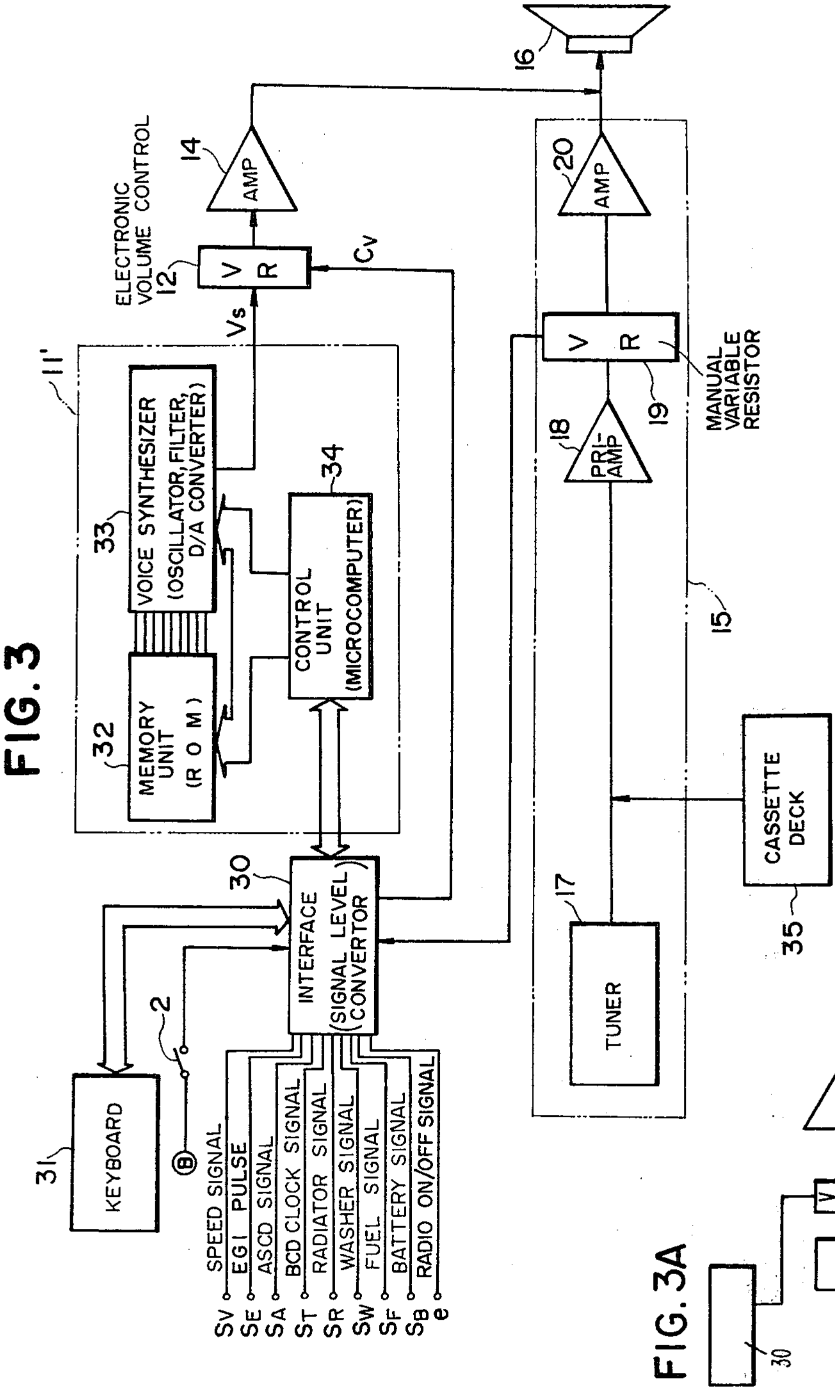
FIG. 3 is a schematic block diagram of a second embodiment of the present invention.
Figure 4:
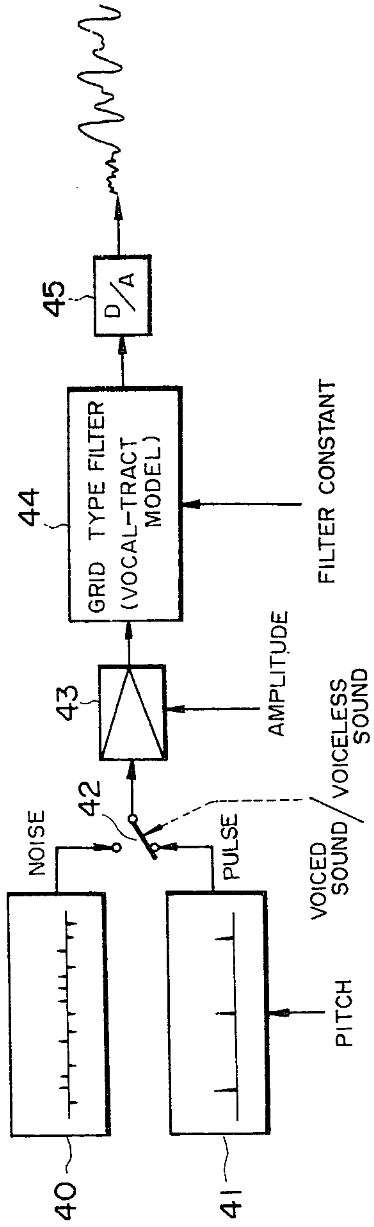
FIG. 4 is a schematic block diagram of assistance in explaining the theory of operation of a voice synthesizer using a linear prediction coding system (LPC)

Reference is now made to FIGS. 3 and 4, wherein a second preferred embodiment of the present invention is illustrated. In this case, the embodiment comprises a microcomputer and a voice synthesizer.

In FIG. 3, the numeral 30 denotes an input/output interface for a microcomputer, which also includes, for example, a signal level converter, and an A-D converter. In the same way as in the first embodiment, the on/off signal of an ignition switch 2 is also inputted to the interface in addition to the speed signal $S_v$, fuel signal $S_f$, washer signal $S_w$. Moreover, in this embodiment, various signals are input to the interface such as an electronic controlled gasoline injection pulse signal $S_e$, automatic speed control signal $S_a$, BCD clock signal $S_t$, radiator liquid signal $S_r$, battery liquid signal $S_b$.

The numeral 31 denotes a keyboard, which is provided in place of the switches 4 and 5.

By using a number of keys on the keyboard 31, it is possible to previously select different items of information required to be indicated to the driver.

The numeral 11' denotes a voice synthesizer using a linear prediction coding (LPC) system including three LSI units, a memory unit (ROM) 32, a synthesizer unit 33 (oscillator, filters, and D-A converters), and a control unit or microcomputer 34, which corresponds to the voice memory 11 in FIG. 1. This control unit 34 is a microcomputer comprising a CPU for controlling all the operations, a memory (ROM) for storing programs and fixed data, a memory (RAM) for storing input/output data, a clock oscillator, etc., which can implement all the operations corresponding to the counter 7, the voice selector 10, and the voice memory 11, as explained in the first embodiment in FIG. 1, using the method of time sharing.

As is well known in the art, a voice synthesizer based on the LPC system has recently been put on the market at a reasonable price by Texas Instruments Incorporated of the USA. FIG. 4 shows schematically the principle of operation of this voice synthesizer.

In this synthesizer, psuedo-random noise signals generated from the first sound source oscillator (white noise generator) 40 are selected by a switch 42 to produce voiceless sounds, and periodic impulse signals generated from the second source oscillator (impulse generator) 41 are selected by the switch 42 to produce voiced sounds. After being amplified by an amplifier 43, these signals are formed into a voice sound by a grid-type filter 44 where the resonance characteristics of the human vocal tract (vocal organs such as tongue and lips located above the vocal chords) in speaking is modeled, and are outputted as a synthesized voice signal after conversion into an analog signal through a D-A converter 45.

The different values of constants such as the pitch of the periodic impulse signal, the distinction between voiced and voiceless sounds, the ratio of the amplification of the amplifier 43, and the filter constant of the grid-type filter 44, are stored in the memory unit (ROM) 32 of FIG. 3.

The synthesizer unit 33 comprises various circuits which correspond to a first sound source oscillator 40, a second sound source oscillator 41, a switch 42, an amplifier 43, a grid-type filter 44, a D-A converter 45 so that the synthesized voice sound signal $V_s$ necessary for warning information can be output after being controlled according to the output signal selected by the control unit 34.

Figure 3A:
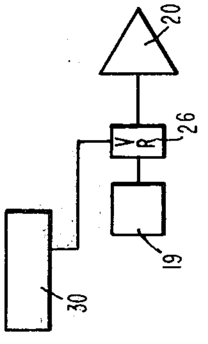
FIG. 3A is a schematic block diagram of a modification of the embodiment of FIG. 3, in which an electrically variable resistor 26 is additionally provided.

As in the first embodiment, the microcomputer as the control unit 34 can also determine the voice output according to the kind of warning information, decide the volume of voice according to the volume setting of the volume control 19 of the car radio 15, and output a sound volume control signal $C_v$ through the interface 30 to operate the electronic volume controller 12. In addition, if necessary, it is possible to output a second sound volume control signal $C_v'$ from the interface 30 to another electric volume control 26 provided in the car radio 15 in order to reduce the radio sound volume only while the warning information is being output, as shown in FIG. 3A.

The numeral 35 denotes a cassette deck as an example of other audio equipment provided in the vehicle such as a car-stereo and a car TV. In any case, it is possible to detect the sound volume adjusted by driver preference by providing means for storing the volume setting for the equipment, for example, by using a variable resistor directly linked to the volume control.

In the second embodiment as in the first embodiment, different items of information on vehicle conditions can be indicated to the driver. These include, for example, the distance traveled based on a trip meter signal, the distance which may be traveled on the remaining fuel based on a fuel signal, the rate of fuel consumption based on a fuel signal and a trip meter signal, and an average vehicle speed based on a trip meter signal and a time interval signal, in addition to the vehicle speed based on a speed signal, the electronic controlled gasoline injection condition based on an EGI pulse signal, the automatic speed control device condition based on an ASCD signal, the time based on a BCD clock signal, the radiator coolant state based on a radiator signal, the amount of washer liquid based on a washer signal, the amount of remaining fuel based on a fuel signal, and the amount of battery electrolytic solution based on a battery signal, as shown in FIG. 3.

Further, it is desirable to provide a timer to allow the voice warning system to be operated for a while even after the ignition switch has been turned off, for example, in order to inform the driver of washer liquid condition.

Figure 5:
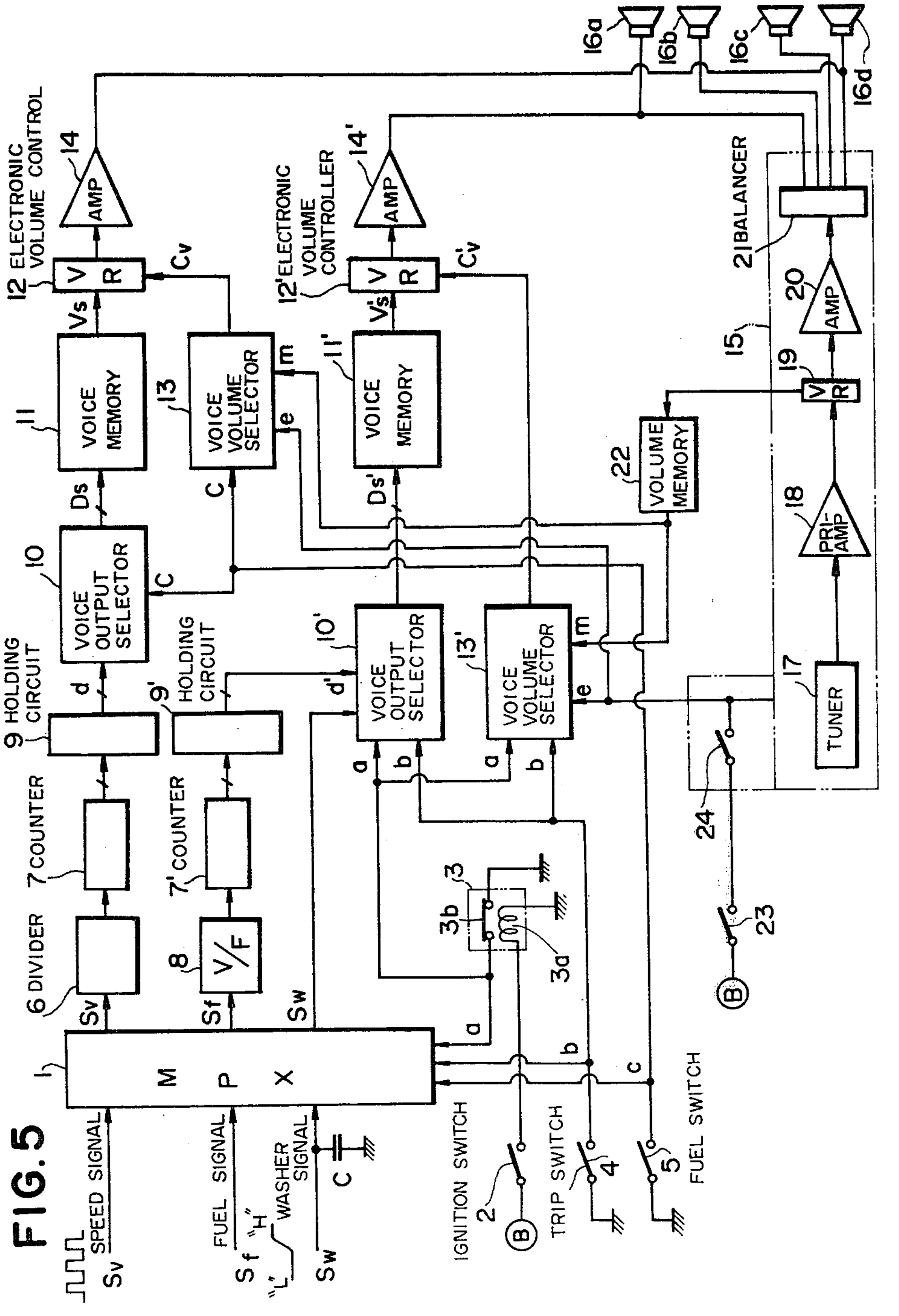
FIG. 5 is another schematic block diagram of the first embodiment where the voice memories, electronic volume controllers, and emplifiers are provided in dual channels.

FIG. 5 shows another embodiment of the present invention. As understood readily, this voice warning system has two channels for outputting two kinds of voice information at the same time.

In one channel voice warning system, if two kinds of voice information are required to be indicated to the driver at a time, it is necessary to predetermine the order of priority according to the importance of the warning information or to disregard one of them. And, when two kinds of voice information are indicated successively, the driver may misunderstand the meaning of information in some cases. Therefore, in this embodiment, there are provided at least two-channel voice memories 11 and 11', electronic volume controls 12 and 12', amplifiers 14 and 14', and other units. In this case, however, it is also possible to design the system by using one voice output selector (either 10 or 10') and one voice volume selector (either 13 or 13'). Further, in this case, if two kinds of information having different tone, pitch and loudness are output, for example, if male voice is output from a channel and female voice is output from the other channel, the driver can distinguish the information readily even when two kinds of information are output at a time.

As described above, according to the present invention, since the voice volume of warning information is automatically changed to an appropriate sound level according to the kind of the information, the driver can hear important or urgent information at a relatively higher sound level and other information at a lower level.

In addition, since a car-radio sound volume as adjusted by driver preference is stored by a volume memory, it is possible to inform the driver of voice information at an appropriate sound level according to driver preference.

Further, since the operation of the car radio is detected by a voltage signal, it is possible to adjust the voice information to a louder level only while the car radio is operating.

Furthermore, it is possible to design the system so as to output a sound volume control signal $C_v'$ to reduce the sound level of the car radio, only while the voice information is being indicated to the driver.

It will be understood by those skilled in the art that the foregoing description is in terms of preferred embodiments of the present invention wherein various changes and modifications may be made without departing from the spirit and scope of the invention, which is to be defined by the appended claims.

What is claimed is:

1. A voice warning system for an automotive vehicle, which comprises:

(a) a plurality of information switches;

(b) a multiplexer for selectively outputting one of various signals indicating vehicle operating conditions when one of said switches is actuated;

(c) a voice output selector for outputting a voice output designation signal $D_s$ in accordance with the signal from said multiplexer;

(d) a voice memory for storing a number of voice outputs and for outputting a series of voice signals $V_s$ in response to the voice output designation signal $D_s$ from said voice output selector;

(e) an electronic volume controller for controlling the level of voice signals $V_s$ outputted from said voice memory; and (f) a voice volume selector for selectively outputting different voltage signals $C_v$ to said electronic volume controller, by using a potential divider including a plurality of resistors, when one of said information switches is turned on, whereby the voice is automatically changed according to the kind of information warning of various vehicle operating conditions.

2. A voice warning system for an automotive vehicle as set forth in claim 1, wherein said voice volume selector further comprises a relay connected to one of the resistors in the potential divider to short the resistor only when the power supply of the car radio is turned on, whereby the voice volume is made louder only while the car radio is operating.

3. A voice warning system for an automotive vehicle as set forth in claim 1, wherein said voice volume selector further comprises a volume memory connected in series electrically between two resistors in the potential divider and linked mechanically to a volume control provided in the car radio, whereby the voice volume of warning information is output according to the sound volume as adjusted by driver preference.

4. A voice warning system for an automotive vehicle as set forth in claim 1, which further comprises another volume control provided in the car radio in order to reduce the sound volume of the car radio in response to a signal $C_v'$ outputted from said voice volume selector only while the voice warning information is being outputted.

5. A voice warning system for an automotive vehicle as set forth in claim 1, 2, 3, or 4, which further comprises:

(a) another voice memory;

(b) another electronic volume control;

(c) another amplifier; whereby two kinds of voice information are output at a time.

6. A voice warning system for an automotive vehicle as set forth in claim 5, wherein the two kinds of information are outputted with different tone, pitch and loudness.

7. A voice warning system for an automotive vehicle, which comprises;

(a) a keyboard for previously selecting various signals indicating vehicle operating conditions;

(b) an interface for inputting and outputting the various signals selected by said keyboard;

(c) an LPC type voice synthesizer system comprising:

(1) a voice synthesizer having a first sound source oscillator for generating pseudo-random noise signals, a second sound source oscillator for generating periodic impulse signals, a grid-type filter of vocal tract model, and a D-A converter for converting a digital voice signal to an analog voice signal, $V_s$, (2) a memory unit (ROM) for storing voices synthesized by said voice synthesizer;

(3) a control unit comprising a microcomputer for controlling input/output of the various signals through said interface and for producing different items of voice information through said synthesizer;

(d) an electronic volume controller for controlling the level of voice signal $V_s$ outputted from said synthesizer according to a voice volume control signal $C_v$ sent from said control unit through said interface; and (e) a manually variable resistor for adjusting the sound volume of the car radio, the resistance of which is transmitted to said control unit through said interface in order to control the voice volume of warning information according to the sound volume value as set by driver preference.

8. A voice warning system for an automotive vehicle, as set forth in claim 7, which further comprises an electronic variable resistor for reducing the sound volume of car radio in response to a signal $C_v'$ outputted from said control unit through said interface only while the voice information is being outputted.

* * * * *